United States Patent [19]

Verhoeven

[11] 3,946,265

[45] Mar. 23, 1976

[54] VIDICON WITH GRID WIRE ANGLES SELECTED TO MINIMIZE CHROMINANCE SIGNAL INTERFERENCE

[75] Inventor: Leonardus Adrianus Johannes Verhoeven, Eindhoven, Netherlands

[73] Assignee: U.S. Philips Corporation, New York, N.Y.

[22] Filed: Dec. 10, 1971

[21] Appl. No.: 206,948

Related U.S. Application Data

[63] Continuation of Ser. No. 71,468, Sept. 11, 1970, abandoned.

[52] U.S. Cl. .................... 313/390; 313/458; 358/64

[51] Int. Cl.[2]. H01J 31/28; H01J 31/38; H04N 9/04

[58] Field of Search........ 313/83, 68 R, 65 R, 65 A, 313/65 T, 66

[56] References Cited

UNITED STATES PATENTS

| | | | |
|---|---|---|---|
| 2,837,689 | 6/1958 | Dufour | 313/83 X |
| 3,035,203 | 5/1962 | Fischman | 313/83 X |

FOREIGN PATENTS OR APPLICATIONS

| | | | |
|---|---|---|---|
| 1,237,168 | 3/1967 | Germany | 313/65 T |

*Primary Examiner*—Robert Segal
*Attorney, Agent, or Firm*—Frank R. Trifari; Carl P. Steinhauser

[57] ABSTRACT

A television camera tube having a conductive gauze behind the target plate, the parallel wires of which cross each other at an acute angle which has been suitably chosen to minimize interference in decoded colour signals.

4 Claims, 3 Drawing Figures

INVENTOR.

BY LEONARDUS A.J. VERHOEVEN

AGENT

VIDICON WITH GRID WIRE ANGLES SELECTED TO MINIMIZE CHROMINANCE SIGNAL INTERFERENCE

This is a continuation, of application Ser. No. 71,468, filed 9-11-70, and now abandoned.

This invention relates to a television camera tube having a target plate for producing a potential image corresponding to a scene to be picked-up and an electron gun for producing an electron beam to scan the potential image on the target plate, a conductive gauze of two interwoven crossing sets of parallel wires being provided behind the target plate at the side of the electron gun.

The gauze is usually provided at a few millimetres from the target plate and serves to shut off the field of the electrodes behind the gauze, thus ensuring that the electron beam strikes the target plate substantially perpendicularly. The gauze is usually manufactured by electrolytic deposition of copper in two intersecting sets of parallel grooves in a glass plate. In a gauze thus manufactured the wires physically constitute one unit. The term "interwoven crossing sets of parallel wires" is therefore intended to include this structural form and does not mean that the gauze must be manufactured by uniting separate wires.

Known television camera tubes of the said kind include a gauze in which the wires in one set of the crossing sets of parallel wires are substantially parallel to those of the other set. Such a gauze is made as fine-meshed as possible with a view to restricting as far as possible any interference in the electrical signals provided by said tubes due to the electron beam passing across the wires of the gauze, the gauze being so oriented that its wires are at an angle of 45° to the direction of the frame scan. Despite these steps, when using known tubes in certain colour television systems, an unwanted interference in the decoded chrominance signals still occurs which becomes manifest in interference patterns in the image display, said interference being due to interference frequencies in the luminance signal resulting from the electron beam passing across the wires of the gauze, which frequencies fall within the same frequency band as the chrominance signal and give rise to the so-called "cross colour interference." In these tubes the tolerances for the orientation of the wires of the gauze are extremely narrow and it is almost impossible to rotate the tube relative to the direction of scanning, as may be desirable in order to turn away areas on the target plate not properly reacting to the incident light, so-called speckles, out of the region scanned by the electron beam, because this interference drastically increases for a small deviation from the said orientation.

An object of the invention is to provide a television camera tube in which said disadvantages are mitigated.

According to the invention, in a tube of the kind mentioned in the first paragraph, the wires of one set of the crossing sets of parallel wires intersect those of the other set at a suitably chosen acute angle, in order to minimize interference in decoded chrominance signals due to the electron beam passing across the wires of the gauze.

The invention underlies an anaylsis of the frequency spectra of line patterns in a television image which represent the influence of a gauze behind the target plate. For colour television systems in which the interference frequency spectra of the lines lie within the band of the chrominance signals, the location of the components of the interference spectrum as a function of the angle $\alpha$ between the lines and the frame scan direction has been investigated. For lines which are parallel to the frame scan direction, the spectrum is composed of multiples of the line frequency. For lines which are inclined to the frame scan direction, the components of the spectrum are located a little more apart or a little closer together. The spectrum is thus, as it were, slightly shifted relative to the original spectrum in the vicinity of the subcarrier frequency. From the analysis of the spectra it appears that the interference spectrum components of the lines are in general maximally separated from the spectrum components of the chrominance signals and hence cause minimum interference in the chrominance signals for a determined angle $\alpha$ which differs from 45°, while the interference increases comparatively little for deviations from the angle $\alpha$ which are not excessive. To meet the envisaged purpose, it must on the ground thereof be possible to choose as the angle between the wires of the gauze and the frame scan direction, either the said angle or one which does not unduly differ therefrom and the wires of the gauze are required to form twice as large an angle with one another, which latter angle itself or its component is acute, while the tube according to the invention has the characteristic specified in the previous paragraph. The range of angles to be chosen cannot in itself be specified in greater detail, since the optimum angle and the permissible region of angles depend upon the colour television system for which the tube is to be used.

The investigation indicated above has revealed that for the European P.A.L. system the interference is minimum if the angle between the wires of the gauze and the frame scan direction is 40°. The interference changes to a very slight extent in the two colour information signals if the said angle changes by a few degrees. Therefore the invention relates more particularly to a tube in which the wires of the gauze form an acute angle of approximately 80° with one another. It is already advantageous if this angle, which preferably lies as close as possible to 80°, is chosen between 60° and 88°.

The invention relates more particularly to a tube in which the wires of the gauze form an angle between 60° and 80°, which tube can be used with advantage for both the European P.A.L. system and the American N.T.S.C. system.

In order that the invention may be readily carried into effect, it will now be described in detail, by way of example, with reference to the accompanying drawing, in which FIG. 1 is a longitudinal sectional view of one embodiment of a television camera tube according to the invention;

Figure 1:
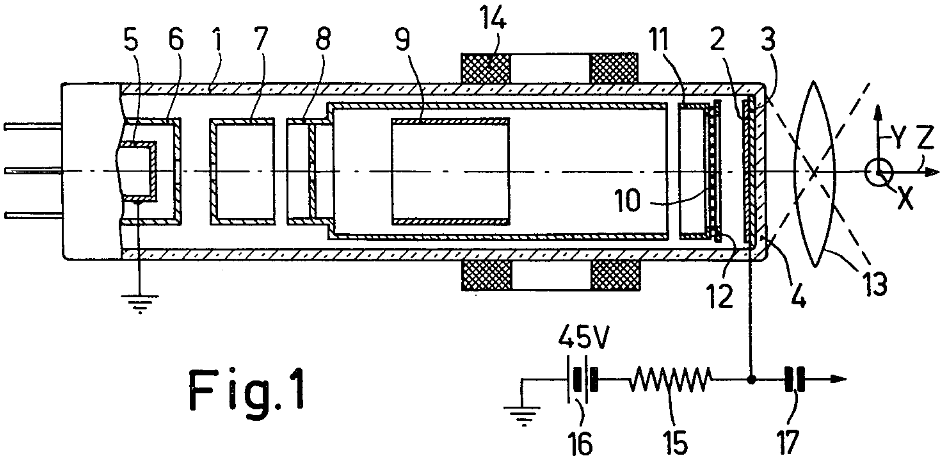

In FIG. 1 the exhausted cylindrical glass envelope of the television camera tube is indicated by 1. The tube is of the "Plumbicon" type. A target plate 2 consists of a photoconductive coating of substantially lead monoxide which has been vapour-deposited on a signal plate 3, which is a thin layer of high-conductive tin oxide applied to the back of a window 4 formed by one extremity of the envelope 1. The electron gun of the tube comprises a cathode 5, a control grid 6 and an accelerating anode 7. In front of the accelerating anode 7 is a second anode 8 which houses a focusing electrode 9. At a distance of a few millimetres from the target plate is fitted a copper gauze 10 which serves to shut off the field of the electrodes located behind the gauze, thus ensuring that the electrons of the electron beam produced by the gun impinge on the target substantially at right angles. The gauze is fixed in position between two copper-nickel rings 11 and 12.

Figure 2:
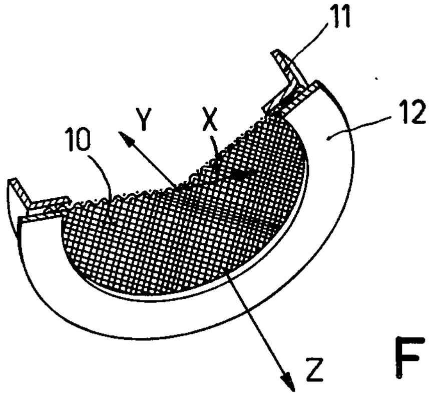
FIG. 2 is a perspective view of the manner in which the gauze is fitted in the tube of FIG. 1.
Figure 3:
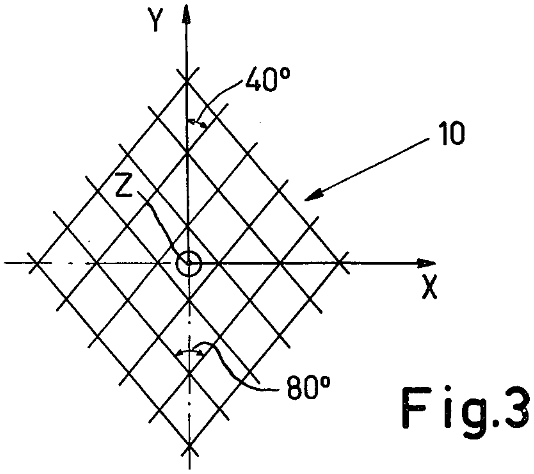
FIG. 3 is an elevational view of a central portion of the gauze in the tube of FIGS. 1 and 2 on an enlarged scale.

FIGS. 2 and 3 show that the gauze 10 comprises two intersecting sets of parallel wires which form an angle of 80° with one another. The gauze 10 is manufactured by electrolytic deposition of copper in two sets of parallel grooves intersecting at 80° in a glass plate, so that the sets of wires physically constitute one unit.

The tube is intended more particularly for use in the European P.A.L. system, in which the output signals from three tubes — one for each basis colour — are united in known manner in a transmission signal having a subcarrier frequency of 4.43 Mc/s.

The tube may then be operated as follows.

With reference to FIG. 1 the elctrodes have the following potentials:

| | |
|---|---|
| the cathode (5) | : 0 volt |
| the control grid (6) | : between −100 and 0 volt |
| the first anode (7) | : 300 volts |
| the second anode (8) | : 300 volts |
| the focusing electrode (9) | : 600 volts |
| the signal electrode (3) | : 45 volts |

As shown diagrammatically, the cathode is connected to earth and the signal plate 3 is connected through a signal resistor 15 to one terminal of a voltage source 16. The said terminal has a voltage of 45 volts with respect to the other grounded terminal.

The scene to be picked-up is displayed on the target plate 2 of the tube through the window 4 and the signal plate 3 by means of an optical system shown diagrammatically by a lens 13, thus causing the photoelectric current in elementary regions of target plate 2 having a value which depends upon the incident light intensity, so that the potential of the free surface area of the elementary regions is increased as a function of the incident light intensity and a potential image corresponding to the scene to be picked-up appears on the free surface of the target plate.

The electron beam produced by the gun is deflected by line- and image-deflection means shown diagrammatically be a coil system 14, so that the target plate is scanned along a rectangular frame. The free surface of the target plate is then reduced to the cathode potential at which the resulting fluctuations in potential eppear as output signals corresponding to the scene across the signal resistor from which the output signals are derived via a capacitor 17.

The orientation of the tube and the gauze are indicated by the relative perpendicular directions X, Y and Z shown in FIGS. 1, 2 and 3, which represent respectively the line scan direction, the frame scan direction and the direction of the axis of the deflection means. The drawing shows that the axis of the tube coincides with the axis (Z) of the deflection means, the wires of the gauze 10 forming angles of 40° with the frame scan direction (Y).

The tube which has been described here by way of example with reference to the Figures can also be used for the American N.T.S.C. system. In this system X and Y, as stated hereinbefore, have to be exchanged. In the American N.T.S.C. system the unwanted interference in the decoded chrominance signals is avoided, though not optimally, to a satisfactory extent. In the European P.A.L. system the angles of 40° and 80° specified in the Example are optimum for avoiding the interference.

What is claimed is:

1. A television camera tube of the vidicon type suitable for use for transmission of color television signals comprising an evacuated envelope, and within the envelope an electron beam source, a photosensitive target spaced from the electron beam source and positioned to receive an image of a scene, means to scan said target with said beam for generating a raster, and a conductive gauze consisting of two intersecting sets of parallel wires spaced a few millimeters from that side of said target facing said beam source, the wires of one set intersecting those of the other set at an angle between 60° and 80°, and the wires of each set forming equal angles with the frame scan direction, whereby interference in decoded N.T.S.C. and P.A.L. chrominance signals due to the electron beam passing across the wires of the gauze is minimized.

2. An electronic tube comprising an evacuated envelope and having therein a target member, an electron gun for generating an electron beam and deflection means for scanning said electron beam over said target along a plurality of substantially spaced parallel lines, a grid electrode positioned adjacent said target, said grid comprised of a first set of parallel equally spaced members positioned at an angle different from 90° with respect to a second set of parallel equally spaced members and forming diamond-shaped interstices.

3. The device set forth in claim 1 in which said interstices are nonrectangular parallelograms.

4. The device set forth in claim 2 in which said grid electrode is positioned between said target member and said electron gun.

* * * * *

UNITED STATES PATENT AND TRADEMARK OFFICE

CERTIFICATE OF CORRECTION

PATENT NO. : 3,946,265

DATED : March 23, 1976

INVENTOR(S) : LEONARDUS A.J. VERHOEVEN

It is certified that error appears in the above-identified patent and that said Letters Patent are hereby corrected as shown below:

ON THE TITLE PAGE

After section "[22]" insert on a separate line:

--[30] Foreign Application Priority Data

Sept. 17, 1969 Netherlands......6914066--.

Signed and Sealed this

*Twentieth* Day of *September 1977*

[SEAL]

*Attest:*

RUTH C. MASON
*Attesting Officer*

LUTRELLE F. PARKER
*Acting Commissioner of Patents and Trademarks*